United States Patent
Brot et al.

(10) Patent No.: US 10,054,955 B2
(45) Date of Patent: Aug. 21, 2018

(54) RUDDER CONTROL METHOD AND SYSTEM FOR AN AIRCRAFT

(71) Applicant: Airbus Operations S.A.S., Toulouse (FR)

(72) Inventors: Patrice Brot, Ramonville-Saint-Agne (FR); Sylvain Devineau, Balma (FR)

(73) Assignee: Airbus Operations S.A.S. (FR)

( * ) Notice: Subject to any disclaimer, the term of this patent is extended or adjusted under 35 U.S.C. 154(b) by 233 days.

(21) Appl. No.: 14/966,170

(22) Filed: Dec. 11, 2015

(65) Prior Publication Data
US 2016/0179098 A1 Jun. 23, 2016

(30) Foreign Application Priority Data
Dec. 19, 2014 (FR) ...................................... 14 62913

(51) Int. Cl.
*B64C 13/50* (2006.01)
*G05D 1/08* (2006.01)
*B64C 13/24* (2006.01)

(52) U.S. Cl.
CPC .......... *G05D 1/0816* (2013.01); *B64C 13/24* (2013.01); *B64C 13/503* (2013.01)

(58) Field of Classification Search
CPC .......................................... G05D 1/08–1/0891
See application file for complete search history.

(56) References Cited

U.S. PATENT DOCUMENTS

| 4,580,210 A * | 4/1986 | Nordstrom | G05D 1/0061 244/17.13 |
| 4,589,061 A * | 5/1986 | Nordstrom | G05D 1/0061 244/195 |
| 5,170,969 A | 12/1992 | Lin | |
| 8,979,036 B2 * | 3/2015 | Brot | B64C 13/08 244/175 |
| 2002/0022910 A1 | 2/2002 | Kubica et al. | |
| 2009/0014595 A1 | 1/2009 | Rougelot et al. | |
| 2013/0075535 A1 * | 3/2013 | Brot | B64C 13/08 244/196 |

OTHER PUBLICATIONS

OpenTX, "Servos (Jul. 13)", <http://open-txu.org/home/undergraduate-courses/basic-airplane-set-up-with-taranis-2/servos-713/>. Sep. 2, 2014. (Year: 2014).*

"Dual rates and expo—how to?", Jan. 29, 2013, Rc heli info, reviews and tutorials, <http://rchelistuff.blogspot.com/2013/01/dual-rates-and-expo-how-to.html?m=1> (Year: 2013).*

(Continued)

*Primary Examiner* — Genna M Mott
(74) *Attorney, Agent, or Firm* — Lerner, David, Littenberg, Krumholz & Mentlik, LLP

(57) ABSTRACT

The system includes a rudder bar configured to be able to be actuated by a pilot of the aircraft, a unit for automatically detecting a position value corresponding to a position of the rudder bar, an auxiliary unit for generating a trim value, a computation unit configured to generate a control value as a function of the position value of the rudder bar and of the trim value. The computation unit is configured to generate the control value according to a nonlinear kinematic relative to the position value of the rudder bar.

18 Claims, 2 Drawing Sheets

(56) References Cited

OTHER PUBLICATIONS

"Condor Setup Screens", Oct. 19, 2014, Condor Cross Country Soaring Center, <https://web.archive.org/web/20141019000246/http:/www.condorxcsoaring.com/condor-setup-screens/> (Year: 2014).*

Page, R. Scott. "Basics of Curves and Tricks with Mixes in OpenTx for Taranis", <https://www.youtube.com/watch?v=SKIQEFnWo9w>. Published Oct. 21, 2013. Transcript and Screen Grabs in Attached PDF created by Examiner for the record (Year: 2013).*

French Search Report (dated Aug. 4, 2015) (FR 1462913).

* cited by examiner

RUDDER CONTROL METHOD AND SYSTEM FOR AN AIRCRAFT

FIELD OF THE INVENTION

The present invention relates to a rudder control method and system for an aircraft, without mechanical rudder trim.

BACKGROUND OF THE INVENTION

Modern aircraft are equipped with flight control systems, of electric type.

In particular, the rudder control system is called electric, because the command ordered by the pilot (position of the rudder bar) is transmitted to a flight control computer in the form of an electrical signal. The computer then uses this pilot command to determine, using internal control laws, the control command which is actually applied to the rudder.

Despite these electrical characteristics, the rudder bar remains a complex mechanical member. It notably comprises a set of springs which makes it possible to recreate a sensation that is artificial (because the rudder bar is no longer linked mechanically to the control surfaces of the aircraft). These artificial sensation generation means also comprise a mechanical rudder trim function. This function, implemented by a mechanical trim, enables the pilot to set the zero load rudder bar position. The adjustment is performed by the pilot using buttons situated in the cockpit.

The presence, on an electric rudder control system as described above, of a mechanical rudder trim, which meets the abovementioned needs, presents drawbacks, notably in terms of weight, cost, installation, bulk, maintenance, etc.

To at least partly remedy these drawbacks, it is known practice from the document FR2980453A1 (or US 2013075535A1) to eliminate the mechanical trim function. The trim then becomes purely software, either manual or automatic. This entails adding a bias between the command from the pilot (characterized by the position of the rudder bar) and a piloting laws input command. A position of the rudder bar at neutral can therefore generate a non-zero command.

However, the addition of such a constant software bias between the position of the rudder bar and the laws input command, presents the following drawbacks:

when the pilot deflects the rudder bar on the same side as the software bias in place, he or she reaches the maximum command before having reached the mechanical endstop of the rudder bar. He or she therefore encounters a dead band (without effect on the aircraft) and he or she thus loses awareness of his or her real authority endstop;

when the pilot deflects the rudder bar in the direction opposite to the software bias in place, he or she will never obtain maximum authority over the laws input command, even with the rudder bar at the mechanical endstop. A loss of aircraft control authority therefore occurs in this situation.

EXPLANATION OF THE INVENTION

An aspect of the present invention may remedy this drawback.

It relates to a rudder control method for an aircraft, comprising the following steps:

automatically detecting a position value corresponding to a position of a rudder bar of the aircraft, said rudder bar being configured to be activated by a pilot of the aircraft;

generating a trim value;

generating a control value as a function of the position value of the rudder bar and of the trim value, said control value being intended to be transmitted to at least one actuator of a rudder of the aircraft.

According to an aspect of the invention, the control value is generated so as to follow a nonlinear kinematic relative to the position value of the rudder bar, this kinematic being such that at least one of the two following conditions is fulfilled: when the position value of the rudder bar corresponds to a maximum endstop position of the rudder bar, the control value corresponds to a maximum control command, and when the position value of the rudder bar corresponds to a minimum endstop position of the rudder bar, the control value corresponds to a minimum control command.

Preferably, this kinematic is such that the abovementioned two conditions are fulfilled: on the one hand, when the position value of the rudder bar corresponds to a maximum endstop position of the rudder bar, the control value corresponds to a maximum control command, and on the other hand, when the position value of the rudder bar corresponds to a minimum endstop position of the rudder bar, the control value corresponds to a minimum control command.

By virtue of the generation of the control value by following a nonlinear kinematic, this method makes it possible, despite the presence of a trim value, that is to say a bias, to make a maximum endstop position of the rudder bar correspond with a maximum control command and to make the minimum endstop position of the rudder bar correspond with a minimum control command.

In effect, the nonlinear kinematic makes it possible to reduce the effect generated by the trim value when approaching the minimum and maximum endstop positions of the rudder bar.

Thus, the pilot can actuate the rudder bar so as to reach the maximum and the minimum control command without knowing the region of displacement of the rudder bar that has no effect on the aircraft (or dead zone).

According to different embodiments of the invention, which can be taken together or separately:

the absolute value of the difference between the control value and a non-trimmed control value increases at least once between the minimum position and a neutral position of the rudder bar and decreases at least once between the neutral position and the maximum position of the rudder bar;

the absolute value of the difference between the control value and the non-trimmed control value increases linearly and decreases linearly;

the absolute value of the difference between the control value and the non-trimmed control value increases linearly between the minimum position and a first position of the rudder bar situated between the minimum position and the neutral position and/or decreases linearly between a second position of the rudder bar and the maximum position, the second position being situated between the neutral position and the maximum position;

the control value OP, the position value PP of the rudder bar and the trim value TL are defined, each, by normalized values in a range ranging from −100% to 100%, the nonlinear kinematic being such that the control value bears out the following relationships:

$OP = (1 - TL/50\%) \times (PP - 50\%) + (TL + 50\%)$, if the position value PP of the rudder bar is greater than 50%;

$OP = (1 + TL/50\%) \times (PP - 50\%) + (TL - 50\%)$, if the position value PP of the rudder bar is less than −50%;

$OP = PP + TL$, if the position value PP of the rudder bar lies between −50% and 50%;

the nonlinear kinematic consists of at least three straight-line segments;

between at least two positions of the rudder bar, the nonlinear kinematic consists of at least one curved segment;

between the minimum position of the rudder bar and the maximum position of the rudder bar, said segment exhibits a single point of inflexion;

said segment is parabolic;

the control value OP, the position value PP of the rudder bar and the trim value TL are defined, each, by normalized values in a range ranging from −100% to 100%, the nonlinear kinematic being such that the control value OP bears out the following relationship:

$$OP=PP+TL-TL\times PP^2;$$

the control value is generated such that it is maximum or minimum only at the moment when the position value of the rudder bar reaches its maximum or its minimum.

The invention also relates to a rudder control system for an aircraft, of electric type, comprising:

a rudder bar configured to be actuated by a pilot of the aircraft;

a unit for automatically detecting a position value corresponding to a position of the rudder bar;

an auxiliary unit for generating a trim value; and a computation unit configured to generate a control value as a function of the position value of the rudder bar and of the trim value, said control value being intended to be transmitted to at least one actuator of a rudder of the aircraft.

According to an embodiment of the invention, the computation unit is configured to generate the control value according to a nonlinear kinematic relative to the position value of the rudder bar, this kinematic being such that at least one of the following two conditions is fulfilled: when the position value of the rudder bar corresponds to a maximum endstop position of the rudder bar, the control value corresponds to a maximum control command, and when the position value of the rudder bar corresponds to a minimum endstop position of the rudder bar, the control value corresponds to a minimum control command.

The invention further relates to an aircraft, in particular a transport airplane, comprising a rudder control system as described previously.

BRIEF DESCRIPTION OF THE DRAWINGS

The attached figures will give a good understanding of how the invention can be produced. In these figures, identical references designate similar elements.

DETAILED DESCRIPTION

Figure 1:
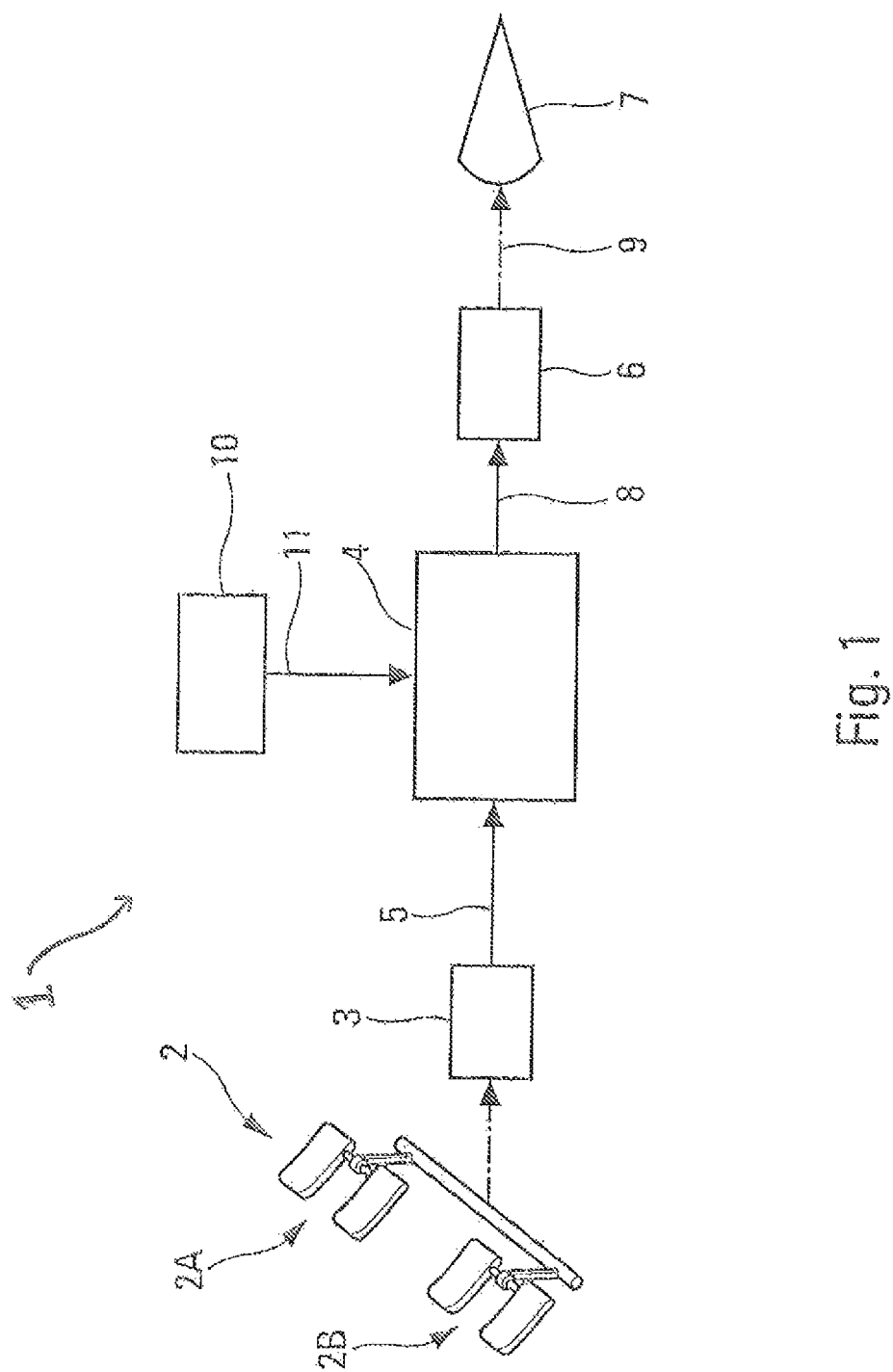
FIG. 1 is the block diagram of an electric rudder control system according to a particular embodiment of the invention.

The system 1 that makes it possible to illustrate the invention and represented schematically in FIG. 1 is a rudder control system of electric type for an aircraft (not represented), in particular an airplane, and notably a transport airplane. This system 1 has no mechanical rudder trim.

The rudder control system 1 (hereinbelow system 1), of electric type, comprises:

a rudder bar 2 (produced in the form of pedals) which is likely to be actuated by the pilot (pedals 2A) or the copilot (pedals 2B) between a minimum endstop and a maximum endstop;

an automatic detection unit 3, associated with said rudder bar 2, which determines its position. The unit 3 generates a position value PP representative of this position, in the form of an electrical signal. The position value PP is minimum when the rudder bar 2 is at the minimum endstop position and the position value PP is maximum when the rudder bar is at the maximum endstop position;

an auxiliary unit 10 configured to generate a trim value TL, in the form of an electrical signal; and a computation unit 4 configured to generate a control value OP as a function of the position value PP of the rudder bar 2, received from the unit 3 via a link 5, and of the trim value TL, received from the auxiliary unit 10 via a link 11.

The system 1 notably comprises at least one actuator 6 of a rudder 7 of the aircraft, to which the control values OP are transmitted via an electrical link 8. This actuator 6 locks the rudder 7 (as illustrated by a chain-dotted line link 9) by a lock value representative of the duly received control values OP.

This system 1 is called electric, because the command ordered by the pilot (by an actuation of the rudder bar 2) is transmitted to the computation unit 4 in the form of an electrical signal.

According to the invention, the computation unit 4 uses the position value PP of the rudder bar 2 to determine, using a nonlinear kinematic specified below and two examples of which are given in FIGS. 2 and 3, the control value OP which is actually applied to the rudder 7.

The control value OP is consequently computed by taking into account the trim value TL and the position value PP relative to which it varies nonlinearly.

Figure 2:
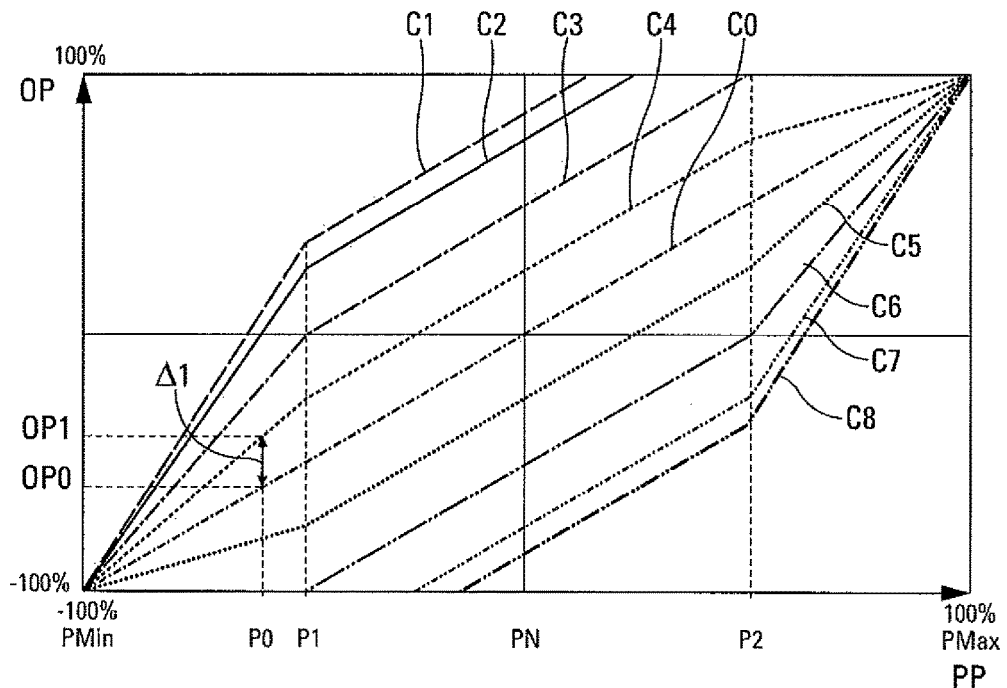
FIGS. 2 and 3 are graphs illustrating nonlinear kinematics for generation of a rudder control value.
Figure 3:
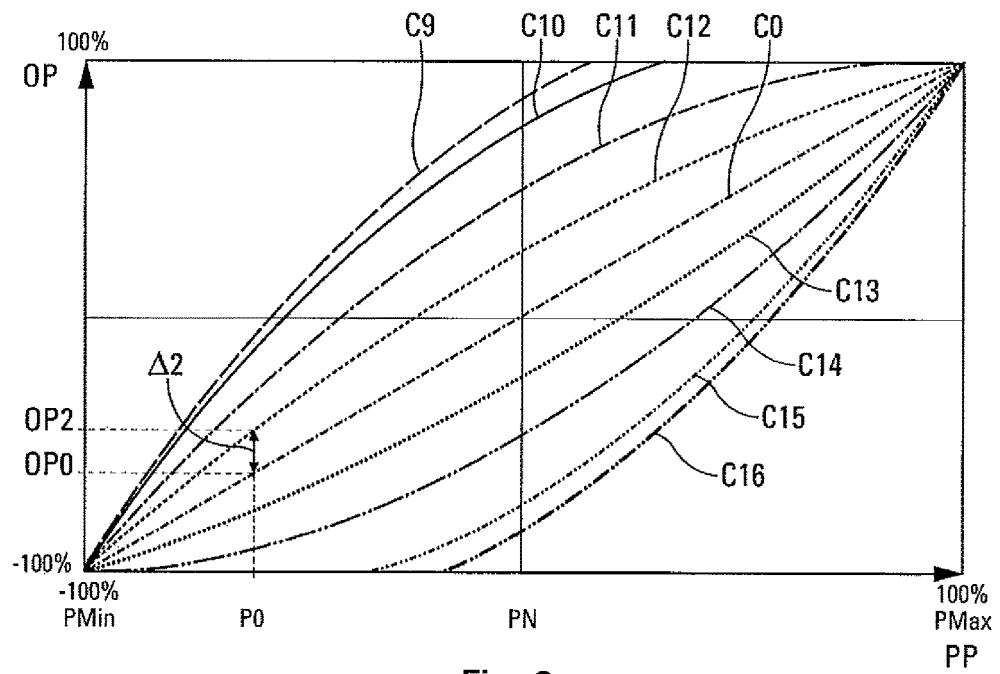

Two examples of nonlinear kinematic that make it possible to compute the control value OP from the position value PP are illustrated respectively in FIGS. 2 and 3. Nonlinear kinematic should be understood to mean a kinematic which does not follow a constant guiding coefficient straight line.

Each of the graphs of FIGS. 2 and 3 represents examples of nonlinear kinematic that the control value OP (on the y axis) follows as a function of the position value PP (on the x axis). Each of the graphs shows a number of curves C1 to C8 and C9 to C16 which illustrate examples of nonlinear kinematic for different trim values TL. The curve C0 represents a non-trimmed control value, that is to say for a zero trim value TL.

In these graphs, the control value OP, the position value PP of the rudder bar and the trim value TL are each defined by normalized values in a range ranging from −100% to 100%.

In these examples, the absolute value $\Delta 1$, $\Delta 2$ of the difference between the control value OP and a non-trimmed control value (on the curve C0), increases at least once between a minimum position PMin of the rudder bar 2 (situated at the extreme left of the x axis) of which the corresponding normalized value is −100% and a neutral position PN of the rudder bar 2 (situated at the center of the x axis), the normalized value of which is 0%. It decreases at least once between the neutral position PN of the rudder bar and a maximum position PMax of the rudder bar (situated at the extreme right of the x axis), the normalized value of which is 100%.

This absolute value $\Delta 1$, $\Delta 2$ is illustrated in FIGS. 2 and 3 by taking the example of a difference when the control value OP follows the nonlinear kinematic C4 and C12. The absolute value Δ1, Δ2 of the difference between the control value OP and a non-trimmed control value for a position P0 of the rudder bar, is equal to:

OP1−OP0 in the example of FIG. 2 for the curve C4; and OP2−OP0 n the example of FIG. 3 for the curve C12.

In the example illustrated in FIG. 2, the absolute value Δ1 of the difference between the control value OP and the trimmed control value increases linearly and decreases linearly.

In particular, the absolute value Δ1 increases linearly between the minimum position PMin and a first position P1 of the rudder bar 2 situated between the minimum position PMin and the neutral position PN, and the normalized value of which is −50%. Furthermore, it decreases linearly between a second position P2 of the rudder bar and the maximum position PMax, the second position P2 being situated between the neutral position PN and the maximum position PMax, and the normalized value of which is 50%.

The nonlinear kinematic illustrated in FIG. 2 is such that the control value OP bears out the following relationships:

OP=(1−TL/50%)×(PP−50%)+(TL+50%), if the position value PP of the rudder bar 2 is greater than 50%;

OP=(1+TL/50%)×(PP−50%)+(TL−50%), if the position value PP of the rudder bar (2) is less than −50%;

OP=PP+TL, if the position value PP of the rudder bar 2 lies between −50% and 50%.

The curves C1 to C8 bear out these relationships each time for a different trim value TL.

Thus, the nonlinear kinematic illustrated in FIG. 2 consists of three straight-line segments. In effect, a first straight-line segment of the curves C1 to C8 extends between PMin and P1, a second straight-line segment of the curves C1 to C8 extends between P1 and P2 and a third straight-line segment of the curves C1 to C8 extends between P2 and PMax.

In the example illustrated in FIG. 3, the nonlinear kinematic represented by the curves C9 to C16 consists of at least one curved segment.

In particular, between the minimum position PMin of the rudder bar 2 and a maximum position PMax of the rudder bar 2, the segment exhibits a single point of inflexion. The segment is here a parabolic curve.

The nonlinear kinematic illustrated in FIG. 3 is such that the control value OP bears out the following relationship:

$$OP=PP+TL-TL\times PP^2.$$

The curves C9 to C16 bear out these relationships each time for a different trim value TL.

As can be seen in FIGS. 2 and 3, the control value OP is generated such that it arrives at least at its maximum or at its minimum simultaneously with the moment when the position value PP of the rudder bar 2 reaches its maximum or its minimum respectively, that is to say when the rudder bar 2 is at maximum endstop PMax or minimum endstop Pmin respectively.

In effect:

when the control value OP follows one of the nonlinear kinematics C1 to C5 or C9 to C14, the control value OP is generated such that it arrives at its minimum simultaneously with the moment when the position value PP of the rudder bar 2 reaches—100%, that is to say at the moment when the position of the rudder bar 2 reaches its minimum PMin; and when the control value OP follows one of the nonlinear kinematics C4 to C8 or C11 to C16, the control value OP is generated such that it arrives at its maximum simultaneously with the moment when the position value PP of the rudder bar 2 reaches 100%, that is to say at the moment when the position of the rudder bar 2 reaches its maximum PMax.

In particular, when the control value OP follows one of the nonlinear kinematics C4, C5 or C11 to C14, the control value OP reaches its maximum and its minimum simultaneously with the moment when the position value PP of the rudder bar 2 reaches 100% and −100% respectively, that is to say at the moment when the position of the rudder bar 2 reaches its maximum PMax and its minimum PMin respectively.

The pilot can thus reach the minimum and the maximum of the control value OP without encountering any dead band in which an action on the rudder bar does not lead to any change in the control value.

The invention claimed is:

1. A rudder control method for an aircraft, said method comprising:

automatically detecting a position value (PP) corresponding to a position of a rudder bar of the aircraft, said rudder bar being configured to be able to be activated by a pilot of the aircraft;

generating a trim value (TL); and generating a control value (OP) as a function of the position value (PP) of the rudder bar and of the trim value (TL), said control value (OP) being transmitted to at least one actuator of a rudder of the aircraft, wherein the control value (OP) is generated so as to follow a nonlinear kinematic (C1 to C8) relative to the position value (PP) of the rudder bar, the kinematic being such that at least one of the two following conditions is fulfilled: when the position value of the rudder bar corresponds to a maximum endstop position (PMax) of the rudder bar, the control value is at a maximum value, and when the position value of the rudder bar corresponds to a minimum endstop position (PMin) of the rudder bar, the control value is at a minimum value, and wherein the kinematic relative to a neutral position value (PN) of the rudder bar has a linear segment extending from a first predetermined threshold on one side of the neutral position to a second predetermined threshold on another side of the neutral position, the linear segment representing the control value based on the trim value having a non-zero value.

2. The method as claimed in claim 1, wherein the absolute value of the difference (Δ1, Δ2) between the control value (OP) and a non-trimmed control value increases at least once between the minimum position (PMin) and a neutral position (PN) of the rudder bar and decreases at least once between the neutral position (PN) and the maximum position (PMax) of the rudder bar.

3. The method as claimed in claim 2, wherein the absolute value (Δ1) of the difference between the control value (OP) and the non-trimmed control value increases linearly and decreases linearly.

4. The method as claimed in claim 3, wherein the absolute value (Δ1) of the difference between the control value (OP) and the non-trimmed control value increases linearly between the minimum position (PMin) and a first position (P1) of the rudder bar situated between the minimum position (PMin) and the neutral position (PN) and/or decreases linearly between a second position (P2) of the rudder bar and the maximum position (PMax), the second position (P2) being situated between the neutral position (PN) and the maximum position (PMax).

5. The method as claimed in claim 1, wherein the control value OP, the position value of the rudder bar PP and the trim value TL are defined, each, by normalized values in a range ranging from −100% to 100%, the nonlinear kinematic being such that the control value OP bears out the following relationships:

OP=(1−TL/50%)×(PP−50%)+(TL+50%), if the position value PP of the rudder bar (2) is greater than 50%;

OP=(1+TL/50%)×(PP−50%)+(TL−50%), if the position value PP of the rudder bar (2) is less than −50%;

OP=PP+TL, if the position value PP of the rudder bar (2) lies between −50% and 50%.

6. The method as claimed in claim 1, wherein the nonlinear kinematic (C1 to C8) comprises at least three straight-line segments.

7. A rudder control method for an aircraft, said method comprising:

automatically detecting a position value (PP) corresponding to a position of a rudder bar of the aircraft, said rudder bar being configured to be able to be activated by a pilot of the aircraft;

generating a trim value (TL); and generating a control value (OP) as a function of the position value (PP) of the rudder bar and of the trim value (TL), said control value (OP) being transmitted to at least one actuator of a rudder of the aircraft, wherein the control value (OP) is generated so as to follow a nonlinear kinematic (C1 to C16) relative to the position value (PP) of the rudder bar, the kinematic being such that at least one of the two following conditions is fulfilled: when the position value of the rudder bar corresponds to a maximum endstop position (PMax) of the rudder bar, the control value is at a maximum value, and when the position value of the rudder bar corresponds to a minimum endstop position (PMin) of the rudder bar, the control value is at a minimum value, wherein the kinematic relative to a neutral position value (PN) of the rudder bar has a linear segment extending from a first predetermined threshold on one side of the neutral position to a second predetermined threshold on another side of the neutral position, and wherein the control value (OP) is generated so as to be a maximum or a minimum only at the moment when the position value (PP) of the rudder bar reaches a maximum thereof or a minimum thereof.

8. The method of claim 7, wherein the absolute value of the difference ($\Delta 1$, $\Delta 2$) between the control value (OP) and a non-trimmed control value increases at least once between the minimum position (PMin) and a neutral position (PN) of the rudder bar and decreases at least once between the neutral position (PN) and the maximum position (PMax) of the rudder bar.

9. The method of claim 8, wherein the absolute value ($\Delta 1$) of the difference between the control value (OP) and the non-trimmed control value increases linearly and decreases linearly.

10. The method as claimed in claim 9, wherein the absolute value ($\Delta 1$) of the difference between the control value (OP) and the non-trimmed control value increases linearly between the minimum position (PMin) and a first position (P1) of the rudder bar situated between the minimum position (PMin) and the neutral position (PN) and/or decreases linearly between a second position (P2) of the rudder bar and the maximum position (PMax), the second position (P2) being situated between the neutral position (PN) and the maximum position (PMax).

11. The method as claimed in claim 7, wherein the control value OP, the position value of the rudder bar PP and the trim value TL are defined, each, by normalized values in a range ranging from −100% to 100%, the nonlinear kinematic being such that the control value OP bears out the following relationships:

OP=(1−TL/50%)×(PP−50%)+(TL+50%), if the position value PP of the rudder bar (2) is greater than 50%;

OP=(1+TL/50%)×(PP−50%)+(TL−50%), if the position value PP of the rudder bar (2) is less than −50%;

OP=PP+TL, if the position value PP of the rudder bar (2) lies between −50% and 50%.

12. The method as claimed in claim 7, wherein the nonlinear kinematic (C1 to C8) comprises at least three straight-line segments.

13. A rudder control system for an aircraft, of electric type, comprising:

a rudder bar configured to be actuated by a pilot of the aircraft;

a unit for automatically detecting a position value (PP) corresponding to a position of the rudder bar;

an auxiliary unit for generating a trim value (TL); and a computation unit configured to generate a control value (OP) as a function of the position value (PP) of the rudder bar and of the trim value (TL), said control value (OP) being configured to be transmitted to at least one actuator of a rudder of the aircraft, wherein the computation unit is configured to generate the control value (OP) according to a nonlinear kinematic relative to the position value (PP) of the rudder bar, the kinematic being such that at least one of the following two conditions is fulfilled: when the position value of the rudder bar corresponds to a maximum endstop position (PMax) of the rudder bar, the control value is at a maximum value, and when the position value of the rudder bar corresponds to a minimum endstop position (PMin) of the rudder bar, the control value is at a minimum value, wherein the kinematic relative to a neutral position value (PN) of the rudder bar has a linear segment extending from a first predetermined threshold on one side of the neutral position to a second predetermined threshold on another side of the neutral position, wherein the linear segment has a constant slope between the first predetermined threshold and the second predetermined threshold, and wherein the constant slope is equal to a slope of a kinematic without the trim value.

14. The system of claim 13, wherein the absolute value of the difference ($\Delta 1$, $\Delta 2$) between the control value (OP) and a non-trimmed control value increases at least once between the minimum position (PMin) and a neutral position (PN) of the rudder bar and decreases at least once between the neutral position (PN) and the maximum position (PMax) of the rudder bar.

15. The system of claim 14, wherein the absolute value ($\Delta 1$) of the difference between the control value (OP) and the non-trimmed control value increases linearly and decreases linearly.

16. The system of claim 15, wherein the absolute value ($\Delta 1$) of the difference between the control value (OP) and the non-trimmed control value increases linearly between the minimum position (PMin) and a first position (P1) of the rudder bar situated between the minimum position (PMin) and the neutral position (PN) and/or decreases linearly between a second position (P2) of the rudder bar and the maximum position (PMax), the second position (P2) being situated between the neutral position (PN) and the maximum position (PMax).

17. The system of claim 13, wherein the control value OP, the position value of the rudder bar PP and the trim value TL are defined, each, by normalized values in a range ranging from −100% to 100%, the nonlinear kinematic being such that the control value OP bears out the following relationships:

OP=(1−TL/50%)×(PP−50%)+(TL+50%), if the position value PP of the rudder bar (2) is greater than 50%;
OP=(1+TL/50%)×(PP−50%)+(TL−50%), if the position value PP of the rudder bar (2) is less than −50%;
OP=PP+TL, if the position value PP of the rudder bar (2) lies between −50% and 50%.

18. The system of claim 13, wherein the nonlinear kinematic comprises at least three straight-line segments.

* * * * *